US009905351B2

(12) United States Patent
Tatsuta et al.

(10) Patent No.: US 9,905,351 B2
(45) Date of Patent: Feb. 27, 2018

(54) POWER SUPPLY APPARATUS

(71) Applicant: Panasonic Corporation, Osaka (JP)

(72) Inventors: Toshiki Tatsuta, Tokyo (JP); Osamu Ohashi, Kanagawa (JP); Tsuyoshi Nishio, Chiba (JP); Noriaki Asaoka, Kanagawa (JP); Masayoshi Koizumi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 282 days.

(21) Appl. No.: 14/387,492

(22) PCT Filed: Mar. 15, 2013

(86) PCT No.: PCT/JP2013/001769
§ 371 (c)(1),
(2) Date: Sep. 23, 2014

(87) PCT Pub. No.: WO2013/145613
PCT Pub. Date: Oct. 3, 2013

(65) Prior Publication Data
US 2015/0061582 A1 Mar. 5, 2015

(30) Foreign Application Priority Data

Mar. 28, 2012 (JP) ................. 2012-073711

(51) Int. Cl.
*H02J 7/00* (2006.01)
*H01F 27/02* (2006.01)
(Continued)

(52) U.S. Cl.
CPC ............ *H01F 27/02* (2013.01); *B60L 11/182* (2013.01); *B60L 11/1829* (2013.01);
(Continued)

(58) Field of Classification Search
USPC ........................................ 320/108
See application file for complete search history.

(56) References Cited

U.S. PATENT DOCUMENTS

2002/0117320 A1    8/2002  Hyogo
2009/0226201 A1*   9/2009  Kinouchi ........... G03G 15/2042
                                                            399/69
(Continued)

FOREIGN PATENT DOCUMENTS

EP       2833510 A1    2/2015
JP       06-024356 U   3/1994
(Continued)

OTHER PUBLICATIONS

International Search Report for Application No. PCT/JP2013/001769 dated Jun. 4, 2013.
(Continued)

*Primary Examiner* — Robert Grant
(74) *Attorney, Agent, or Firm* — Pearne & Gordon LLP

(57) ABSTRACT

A power supply apparatus capable of appropriately supplying electrical power to a power transmission coil even if a foreign object is heated during power supply. The power supply apparatus (100) is provided with a power supply coil (103a) opposing a power-receiving unit (153) provided to a vehicle and supplying power to the power-receiving unit (153), and a casing (103b) accommodating the power supply coil (103a). In the casing (103b), a first cover (202) is formed on a surface of the casing (103b) opposing the power-receiving unit (153), and a second cover (203) opposing the first cover (202) is arranged between the first cover (202) and the power supply coil (103a).

21 Claims, 6 Drawing Sheets

(51) Int. Cl.
  *B60L 11/18* (2006.01)
  *H02J 5/00* (2016.01)
  *H01F 38/14* (2006.01)
  *B60M 7/00* (2006.01)
  *H02J 7/02* (2016.01)

(52) U.S. Cl.
  CPC .......... *B60L 11/1833* (2013.01); *H01F 38/14* (2013.01); *H02J 5/005* (2013.01); *B60L 2230/16* (2013.01); *B60L 2270/147* (2013.01); *B60M 7/003* (2013.01); *H02J 7/0042* (2013.01); *H02J 7/025* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01)

(56) References Cited

U.S. PATENT DOCUMENTS

| | | | | |
|---|---|---|---|---|
| 2010/0288754 | A1* | 11/2010 | Ookuma | H05B 6/1263 219/660 |
| 2011/0074346 | A1* | 3/2011 | Hall | B60L 3/00 320/108 |
| 2011/0181240 | A1 | 7/2011 | Baarman et al. | |
| 2012/0318586 | A1* | 12/2012 | Atarashi | B60L 5/005 180/2.1 |
| 2012/0319647 | A1* | 12/2012 | Itabashi | H02M 3/33553 320/108 |
| 2015/0102664 | A1 | 4/2015 | Tatsuta et al. | |

FOREIGN PATENT DOCUMENTS

| | | |
|---|---|---|
| JP | 2010-178499 A | 8/2010 |
| JP | 2010-226946 A | 10/2010 |
| JP | 2011-010435 A | 1/2011 |
| WO | 2010/106648 A1 | 9/2010 |
| WO | 2010/129369 A2 | 11/2010 |

OTHER PUBLICATIONS

Supplementary European Search Report for Application No. 13769538.3 dated Sep. 10, 2015.

* cited by examiner

POWER SUPPLY APPARATUS

TECHNICAL FIELD

The present invention relates to an electric supply apparatus that contactlessly supplies electric power using electromagnetic induction to an electric reception section provided in a vehicle.

BACKGROUND ART

A typical known contactless electric supply apparatus is one that is placed on a ground surface and supplies electric power to an electric reception section mounted in a vehicle (for example, Patent Literature (hereinafter, abbreviated as PTL) 1).

In PTL 1, two units, i.e., an electric transmission unit and an electric reception section are provided. The electric transmission unit includes a ring-shaped electric transmission coil and a casing that houses this coil, and is placed on a road surface side position where a vehicle stops, such as a parking space. The electric reception section includes a ring-shaped electric reception coil and a casing that houses this coil, and is placed on the bottom surface of the vehicle at a position that faces the electric transmission unit placed on the ground surface. The surface of the casing that faces the electric reception section of the electric transmission unit (hereinafter referred to as "upper surface") is formed so as to be in parallel with the radial direction of the electric transmission coil.

CITATION LIST

Patent Literature

PTL 1
Japanese Patent Application Laid-Open No. 2011-10435

SUMMARY OF INVENTION

Technical Problem

In the electric supply apparatus according to the related art, however, it is likely that a foreign object is put on the upper surface of the electric transmission unit because the surface of the electric transmission unit is in parallel with the radial direction of the transmission coil. The foreign object on the upper surface involves a problem in that the foreign object is heated to a high temperature by a magnetic flux penetrating the foreign object during electric supply. Moreover, the foreign object heated to a high temperature may cause, for example, a hole at a portion in contact with the foreign object and damage the upper surface. Consequently, the foreign object or the like entering from the damaged portion falls onto the electric transmission coil. This heated foreign object may melt a coating film of a metallic thin wire included in the electric transmission coil and may cause a short circuit between portions of the metallic thin wire of the electric transmission coil.

It is an object of the present invention to provide an electric supply apparatus that can prevent a foreign object from reaching an electric transmission coil and that can appropriately perform an electric supply process even when the foreign object is heated during electric supply.

Solution to Problem

An electric supply apparatus according to an aspect of the present invention is an apparatus that contactlessly supplies electric power using electromagnetic induction to an electric reception section provided in a vehicle, the apparatus including: a ring-shaped electric supply coil that faces the electric reception section and that supplies electric power to the electric reception section; and a casing that houses the electric supply coil, in which the casing includes: a first cover formed on a surface of the casing, the surfacing facing the electric reception section; and a second cover facing the first cover and being placed between the first cover and the electric supply coil.

Advantageous Effects of Invention

According to the present invention, it is possible to prevent a foreign object from reaching an electric transmission coil and thus to appropriately perform an electric supply process even when the foreign object is heated during electric supply.

DESCRIPTION OF EMBODIMENTS

Hereafter, an embodiment of the present invention will be described in detail with reference to the accompanying drawings.

Embodiment 1

<Configuration of Charging System>

Figure 1:
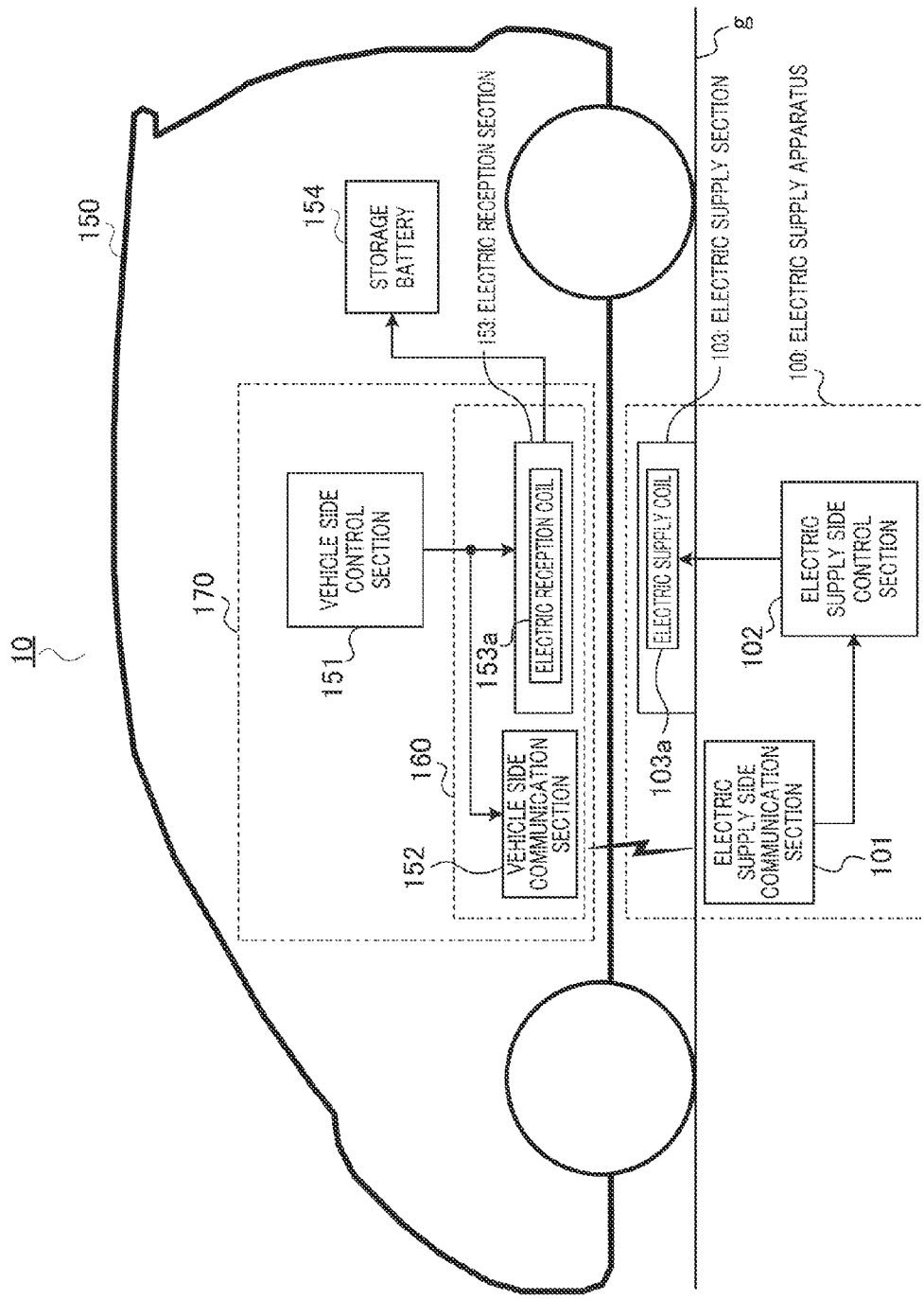
FIG. 1 is a block diagram illustrating an example of the configuration of a charging system according to Embodiment 1 of the present invention.

FIG. 1 is a block diagram illustrating an example of the configuration of charging system 10 in Embodiment 1 of the present invention.

Charging system 10 includes electric supply apparatus 100, vehicle 150, storage battery 154, and charging apparatus 170.

Electric supply apparatus 100 is placed on a ground surface or buried so that electric supply section 103 is exposed from land surface g. Electric supply apparatus 100 is provided, for example, in a parking space and supplies electric power to charging apparatus 170 while facing electric reception section 153, during parking of vehicle 150. The configuration of electric supply apparatus 100 will be described below.

Vehicle 150 includes storage battery 154 and charging apparatus 170, and runs with storage battery 154 as a power source. Vehicle 150 is, for example, an automobile that can run with the electric power of storage battery 154 such as an HEV (Hybrid Electric Vehicle), a PHEV (Plug-in Hybrid Electric Vehicle), or an EV (Electric Vehicle).

Storage battery 154 stores the electric power supplied from charging apparatus 170.

Charging apparatus 170 includes vehicle side control section 151 and electric reception apparatus 160, and supplies the electric power supplied from electric supply apparatus 100, to storage battery 154. The configuration of charging apparatus 170 will be described below in detail.

Vehicle side control section 151 controls electric reception apparatus 160 to perform various processes associated with charging or various processes associated with the stop of charging.

Electric reception apparatus 160 supplies the electric power supplied from electric supply apparatus 100, to storage battery 154 according to the control of vehicle side control section 151. The configuration of electric reception apparatus 160 will be described below.

<Configuration of Electric Supply Apparatus>

Electric supply apparatus 100 includes electric supply side communication section 101, electric supply side control section 102, and electric supply section 103.

Electric supply side communication section 101 receives an electric supply start signal or an electric supply stop signal from vehicle side communication section 152. Electric supply side communication section 101 outputs the received electric supply start signal or electric supply stop signal to electric supply side control section 102.

Electric supply side control section 102 controls electric supply section 103 to start electric supply according to the electric supply start signal inputted from electric supply side communication section 101. Electric supply side control section 102 controls electric supply section 103 to stop electric supply according to the electric supply stop signal inputted from electric supply side communication section 101.

Electric supply section 103 includes electric supply coil 103a. Electric supply section 103 supplies the current having a predetermined frequency to electric supply coil 103a according to the control of electric supply side control section 102 to thereby supply electric power using electromagnetic induction to electric reception section 153. This electric supply is performed in an electromagnetic induction system or a magnetic resonance system, for example. The configuration of electric supply section 103 will be described below in detail.

<Configuration of Electric Reception Apparatus>

Electric reception apparatus 160 includes vehicle side communication section 152 and electric reception section 153.

Vehicle side communication section 152 generates a charging start signal or a charging stop signal according to control of vehicle side control section 151, and transmits the generated charging start signal or charging stop signal to electric supply side communication section 101.

Electric reception section 153 is provided at the bottom portion of vehicle 150. Electric reception section 153 includes electric reception coil 153a and contactlessly faces electric supply section 103 when storage battery 154 is charged. Electric reception section 153 supplies the electric power, which is supplied from electric supply section 103 to electric reception coil 153a, to storage battery 154 according to the control of vehicle side control section 151.

<Configuration of Electric Supply Section>

Figure 2:
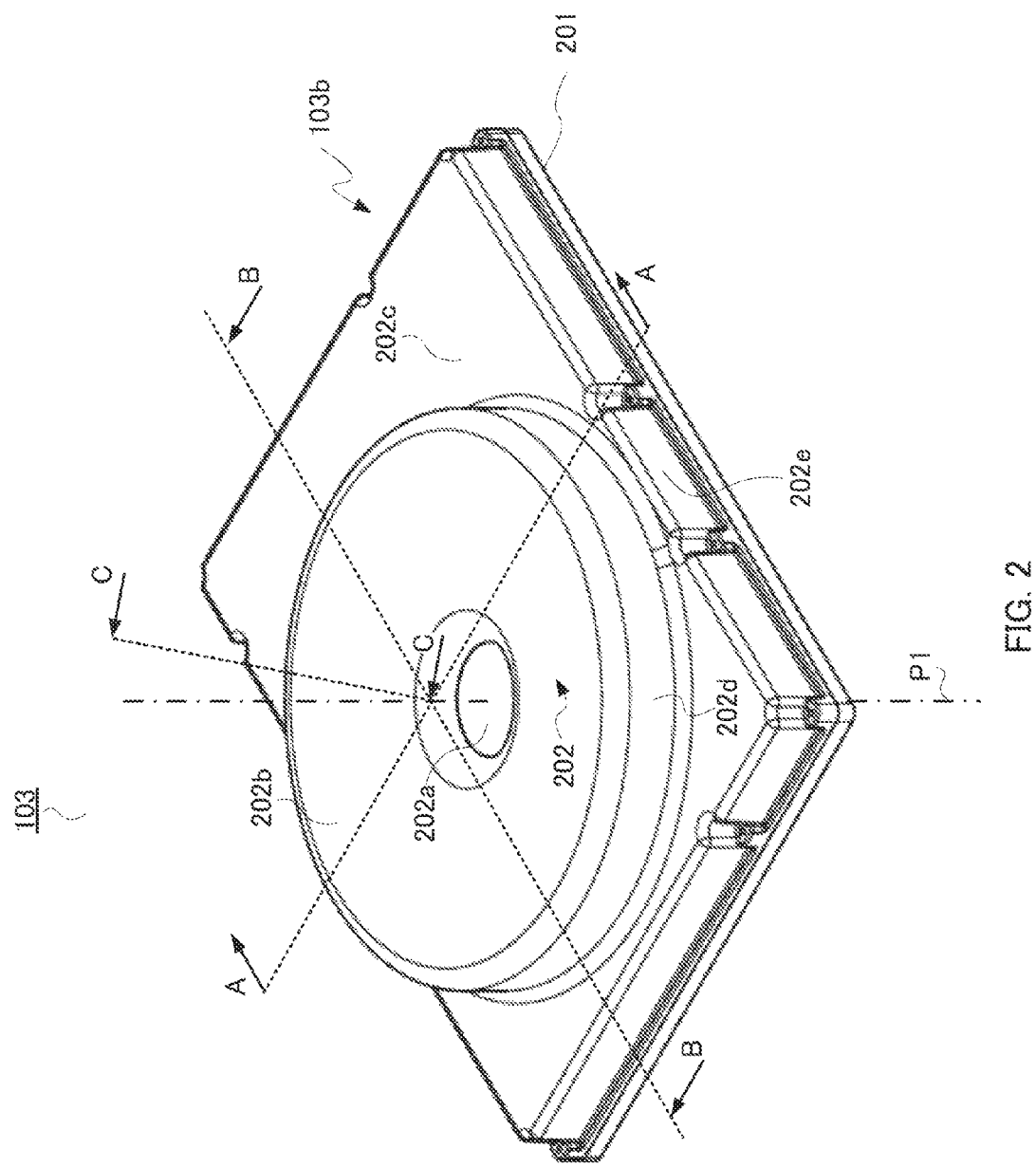
FIG. 2 is a perspective view of an electric supply section according to Embodiment 1 of the present invention.
Figure 3:
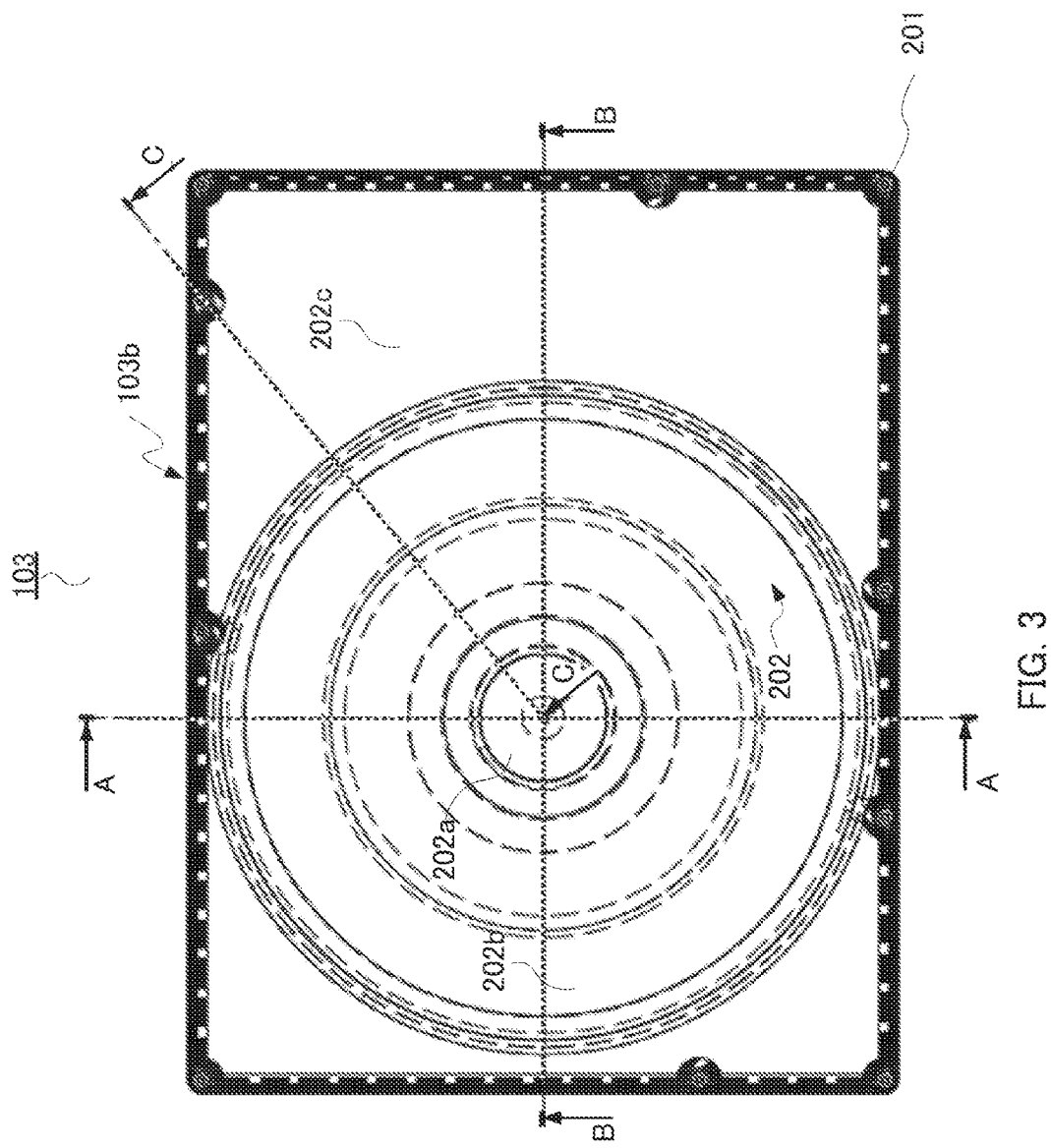
FIG. 3 is a plane view of FIG. 2.
Figure 4:
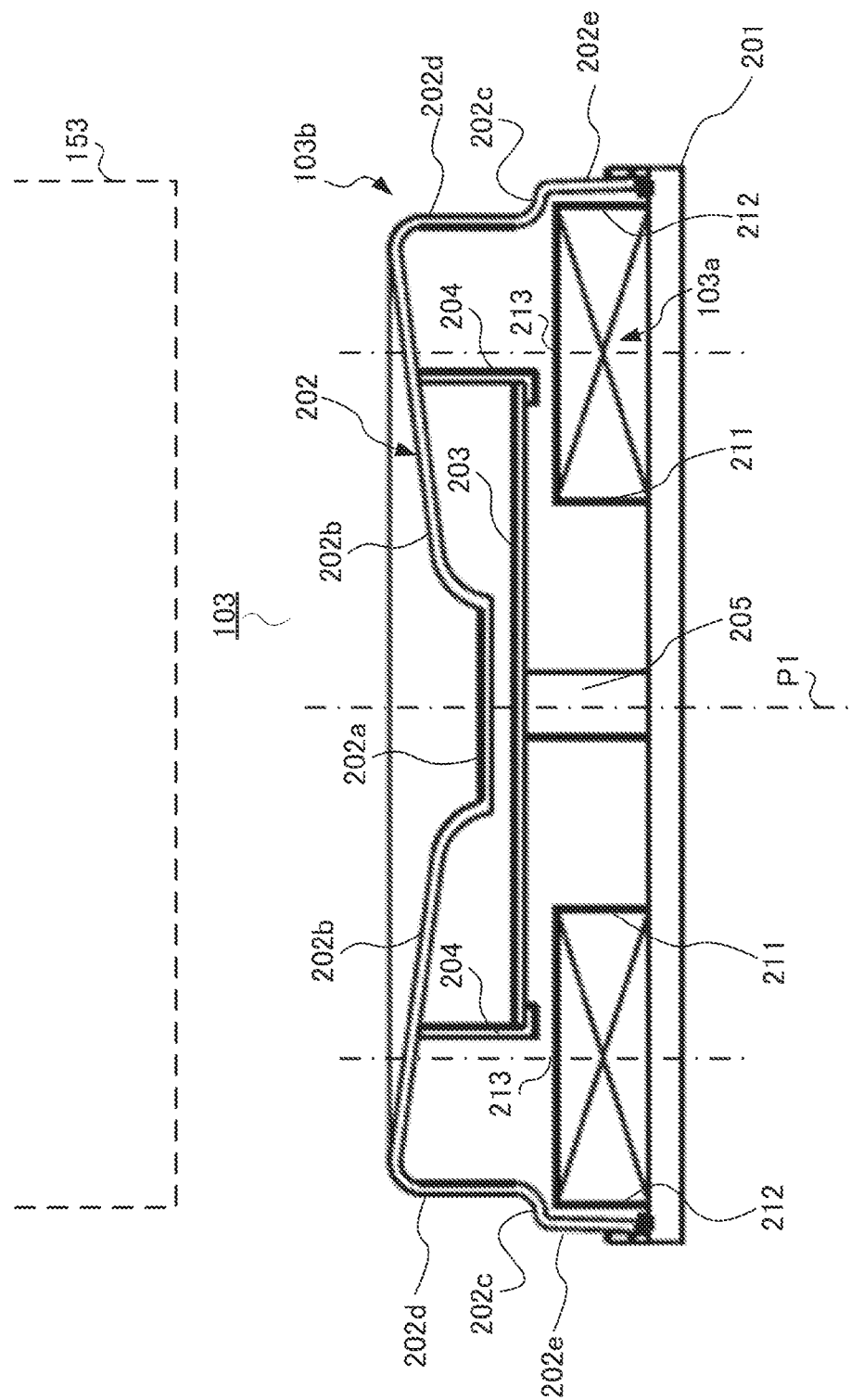
FIG. 4 is a sectional view taken along line A-A in FIG. 2.
Figure 5:
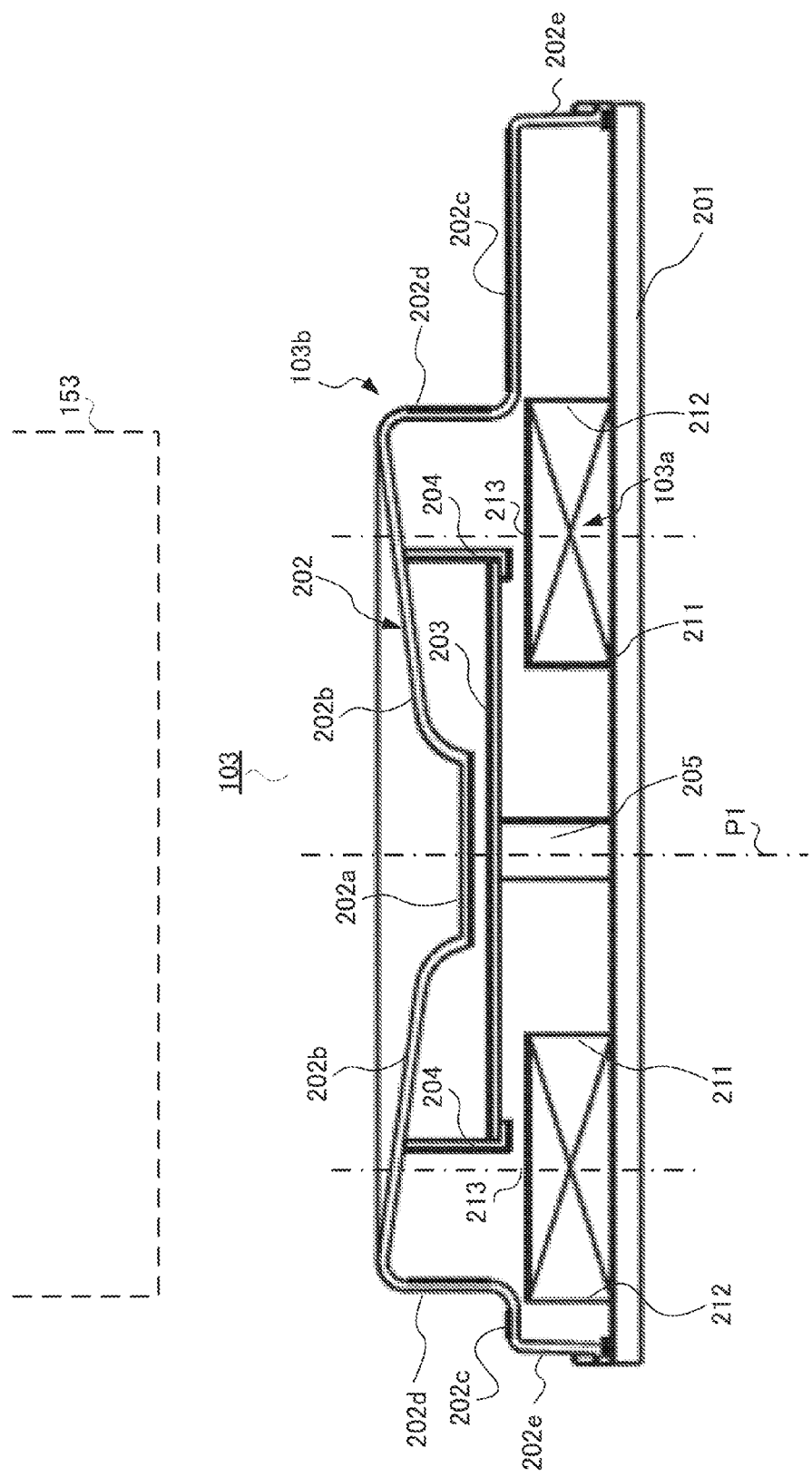
FIG. 5 is a sectional view taken along line B-B in FIG. 2.
Figure 6:
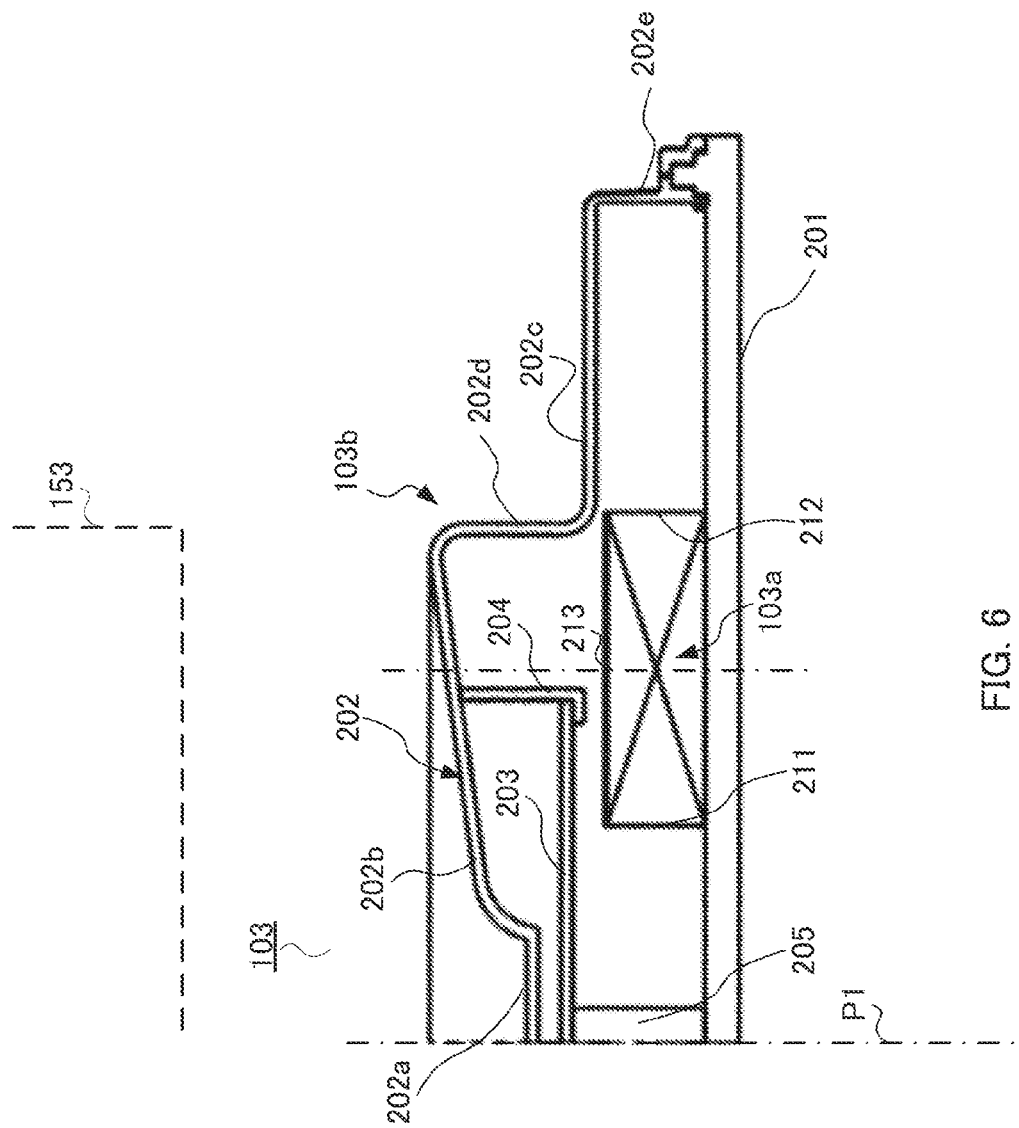
FIG. 6 is a sectional view taken along line C-C in FIG. 2.

FIG. 2 is a perspective view of electric supply section 103, and FIG. 3 is a plane view of electric supply section 103 viewed from the direction of electric reception section 153. FIG. 4 is a sectional view taken along line A-A in FIG. 2, FIG. 5 is a sectional view taken along line B-B in FIG. 2, and FIG. 6 is a sectional view taken along line C-C in FIG. 2. Hereinafter, the configuration of electric supply section 103 will be described mainly with reference to FIG. 2 and FIG. 4.

Electric supply section 103 includes electric supply coil 103a and casing 103b.

Electric supply coil 103a is of a hollow ring shape and placed on inner bottom surface (base) 201 of casing 103b. Electric supply coil 103a is connected, for example, to a commercial power source and supplies electric power to electric reception section 153 by supplying a current from this power source. Electric supply coil 103a is formed, for example, by winding a metallic thin wire.

Casing 103b includes base 201, first cover 202, and second cover 203. Base 201 is formed, for example, in a square flat plate shape (for example, see FIG. 3). Base 201 is formed of a material, such as aluminum. Electric supply coil 103a is placed on base 201, and first cover 202 and second cover 203 are attached to base 201. When first cover 202 and second cover 203 are attached to base 201, casing 103b has first cover 202 on a surface that faces electric reception section 153, and has second cover 203 that faces first cover 202 between first cover 202 and electric supply coil 103a in the direction of central axis P1 of electric supply coil 103a.

First cover 202 is formed of, for example, a nonmetallic material, such as a reinforced plastic, having load capacity. For example, first cover 202 may have such load capacity that no damage is caused even when vehicle 150 expected to use electric supply apparatus 100 is mounted on first cover 202.

In first cover 202: flat portion 202a and incline portion 202b are each formed as a portion of the surface of casing 103b, which faces electric reception section 153; flat portion 202c is formed as a portion other than flat portion 202a and incline portion 202b on the surface of casing 103b, which faces electric reception section 153; side portion 202d in connection with incline portion 202b and flat portion 202c is formed; and side portion 202e connected to flat portion 202c and base 201 is formed.

Flat portion 202a is formed so as to have one end connected to incline portion 202b. When casing 103b is placed on a ground surface, flat portion 202a is formed so as to be located above a hollow portion of electric supply coil 103a. Flat portion 202a is also formed so as to cross central axis P1 of electric supply coil 103a.

Incline portion 202b is formed so as to have one end connected to side portion 202d and the other end connected to flat portion 202a. Incline portion 202b is formed in a portion where electric supply coil 103a is projected when electric supply coil 103a is projected on casing 103b toward electric reception section 153, and so as to gradually approach electric supply coil 103a toward flat portion 202a in the radial direction of electric supply coil 103a. Note that, the radial direction of electric supply coil 103a is a direction orthogonal to central axis P1 of electric supply coil 103a.

Second cover 203 is formed of, for example, a heat-resistant material, such as heat-resistant glass. Second cover 203 is attached, for example, by first reinforcement member 204. Second cover 203 is also placed between first cover 202 and electric supply coil 103a in the direction of central axis P1 of electric supply coil 103a so as to face first cover 202. For example, second cover 203 is also concentric to electric supply coil 103a and is placed so as to cross central axis P1.

The space surrounded by first cover 202, second cover 203, and first reinforcement member 204 is sealed. Even when a heated foreign object stops at second cover 203 after melting first cover 202 and falling off, entering of water such as rain through the hole made in first cover 202 may cause a short circuit between portions of metallic thin wire in electric supply coil 103a. In this regard, sealing the space as described above makes it possible to avoid a situation where water or the like reaches electric supply coil 103a when rain water or the like enters from outside.

First reinforcement member 204 is formed so as to have one end connected to first cover 202 and the other end connected to second cover 203. First reinforcement member 204 attaches second cover 203 to first cover 202 as described above and also supports first cover 202. This can secure the withstand load of first cover 202. First reinforcement member 204 is formed, for example, of an insulator.

Second reinforcement member 205 is formed so as to have one end connected to second cover 203 and the other end connected to base 201. Second reinforcement member 205 is also placed in the hollow portion of electric supply coil 103a. That is, second reinforcement member 205 supports second cover 203. This can secure the withstand load of second cover 203. Second reinforcement member 205 is formed, for example, of an insulator.

<Advantageous Effect of Present Embodiment>

In the present embodiment, first cover 202 is formed on the surface of the casing 103, which faces electric reception section 153. Second cover 203 is placed between first cover 202 and electric supply coil 103a in the direction of central axis P1 of electric supply coil 103a. That is, casing 103b has a dual structure of first cover 202 and second cover 203.

Generally, the heat-resistant material used for second cover 203 is a fragile material such as heat-resistant glass. In considering a situation where vehicle 150 is put on first cover 202, it is not preferable to use such a heat-resistant material for first cover 202. For this reason, in the present embodiment, the part of first cover 202 which is on the outer side of the casing and on which the tire of vehicle 150 may be put is formed of a member having high load capacity such as reinforced plastic, and the part of second cover 203 which is formed of a heat-resistant material is placed between first cover 202 and electric supply coil 103a. These covers provide a dual structure. This configuration enables electric supply apparatus 100 providing both load capacity and heat resistance.

Even when a foreign object on first cover 202 is heated and melts first cover 202, the foreign object falls onto second cover 203. Second cover 203 is heat-resistant as described above. Therefore, even if the foreign object heated to a high temperature falls onto second cover 203, second cover 203 does not melt. Consequently, the foreign object does not contact electric supply coil 103a. As a result, even when a foreign object is, for example, heated during electric supply and damages first cover 202, the foreign object does not reach electric supply coil 103a. Thereby, the heated foreign object can be prevented from falling onto electric supply coil 103a and melting a coating film of a metallic thin wire included in electric supply coil 103a to cause a short circuit between portions of the metallic thin wire of electric supply coil 103a. Thus, an electric supply process can be performed appropriately.

Moreover, in the present embodiment, the heated foreign object does not melt heat-resistant second cover 203. If a hole is made in the cover by heat of the foreign object and exposes the electric supply coil, a human body or the like can contact the electric supply coil, which results in a security problem. With regard to this problem, in the present embodiment, the heated foreign object stops at second cover 203, and there is no chance to expose electric supply coil 103a. This provides an additional advantageous effect in that electric supply apparatus 100 having high security can be provided.

Moreover, in the present embodiment, in first cover 202, incline portion 202b that gradually approaches electric supply coil 103a toward flat portion 202a in the radial direction of electric supply coil 103a is formed in a portion of casing 103b on which electric supply coil 103a is projected when electric supply coil 103a is projected on casing 103b toward electric reception section 153. Thereby, a foreign object on incline portion 202b slides down into flat portion 202a that faces the hollow portion of electric supply coil 103a. Since flat portion 202a is distant from the position corresponding to intermediate position 213 between inner edge portion 211 and outer circumference 212 of electric supply coil 103a, the foreign object on flat portion 202a is not easily heated. This can prevent the foreign object from being heated to a high temperature and thereby damaging first cover 202.

Furthermore, in the present embodiment, as illustrated in FIG. 4, second cover 203 may have a smaller area than the area of first cover 202. A smaller area of second cover 203 enables first reinforcement member 204 used also for attachment of second cover 203 to be placed at a position closer to the center of casing 103b in the radial direction of electric supply coil 103a. This can appropriately set the location of first reinforcement member 204. For example, in comparison with the case (not illustrated) where first reinforcement member 204 is connected near side portion 202d on incline portion 202b, first cover 202 can be supported more stably in the case where first reinforcement member 204 is connected near the center of incline portion 202b (for example, see FIG. 4). This can secure a higher withstand load of first cover 202. The location of first reinforcement member 204 may be determined, for example, in consideration of both the viewpoint of the reinforcement for first cover 202 and the viewpoint of protection of a foreign object by second cover 203.

Meanwhile, as illustrated in FIG. 4 in this case, in a region outside the connection point to first reinforcement member 204 in first cover 202, second cover 203 is not placed in the direction of central axis P1 of electric supply coil 103a. However, the region in which second cover 203 is not placed in first cover 202 in the direction of central axis P1 of electric supply coil 103a corresponds to incline portion 202b, so that it is unlikely that a foreign object stays in the region. Furthermore, the region in which second cover 203 is not placed in the direction of central axis P1 of electric supply coil 103a is distant from electric supply coil 103a in comparison with the region in which second cover 203 is placed. Therefore, in the region in which second cover 203 is not placed in first cover 202 in the direction of central axis P1 of electric supply coil 103a, even if a foreign object exists, the foreign object is not easily heated. From the above, even if the region in which second cover 203 is not placed in first cover 202 in the direction of central axis P1 of electric supply coil 103a exists, it is unlikely that a foreign object is heated to a high temperature and thereby damages first cover 202.

Moreover, in the present embodiment, first cover 202 (in particular incline portion 202b) may be covered with a protective cover coated with a material having a frictional coefficient less than a predetermined value. For example, the predetermined value may be set to approximately a value that makes a foreign object on first cover 202 slidable. This enables a foreign object to readily slide on first cover 202 and to surely slide down into flat portion 202a.

The disclosure of the specification, drawings, and abstract in Japanese Patent Application No. 2012-073711 filed on Mar. 28, 2012, is incorporated herein by reference in its entirety.

INDUSTRIAL APPLICABILITY

An electric supply apparatus according to the present invention is suitable for contactlessly supplying electric power to an electric reception section provided in a vehicle.

REFERENCE SIGNS LIST

103 Electric supply section
103a Electric supply coil
103b Casing
153 Electric reception section
201 Base
202 First cover
202a, 202c Flat portions
202b Incline portion
202d, 202e Side portions
203 Second cover
204 First reinforcement member
205 Second reinforcement member
211 Inner edge portion
212 Outer circumference
213 Intermediate position

The invention claimed is:

1. An electric supply apparatus configured to contactlessly supply electric power using electromagnetic induction to an electric reception section provided in a vehicle, the electric supply apparatus comprising:
   an electric supply coil configured to supply electric power to the electric reception section;
   a first cover covering the electric supply coil, said first cover configured to face the electric reception section; and
   a second cover covering the electric supply coil, said second cover configured to face the electric reception section and being placed between the first cover and the electric supply coil, wherein
   a part of the second cover is distinct from the first cover,
   the part of the second cover is separate from the electric supply coil,
   the part of the second cover is not in direct physical contact with the electric supply coil,
   the part of the second cover is between the first cover and the electric supply coil, and
   at least the part of the second cover has higher heat resistant properties than the first cover.

2. The electric supply apparatus according to claim 1, wherein the electric supply apparatus has a space between the first cover and the part of the second cover.

3. The electric supply apparatus according to claim 1, wherein the electric supply coil is configured to supply electric power to the electric reception section through the first cover and the part of the second cover.

4. The electric supply apparatus according to claim 1, further comprising a casing accommodating the electric supply coil.

5. The electric supply apparatus according to claim 4, wherein the casing includes at least the first cover.

6. The electric supply apparatus according to claim 5, wherein the casing includes at least the second cover.

7. The electric supply apparatus according to claim 5, wherein the first cover forms a part of an out surface of the casing.

8. The electric supply apparatus according to claim 1, wherein a part of the electric supply coil has a ring-shape.

9. The electric supply apparatus according to claim 1, wherein the first cover has higher load capacity than the second cover.

10. The electric supply apparatus according to claim 1, wherein:
    the first cover has load capacity that allows the first cover to withstand a load of the vehicle applied when the vehicle is placed on the first cover; and
    the second cover has heat resistant properties that allow the second cover to withstand heat generation of a foreign object existing between the electric reception section and the electric supply coil.

11. The electric supply apparatus according to claim 1, wherein the second cover is placed between the first cover and the electric supply coil in a direction of a central axis of the electric supply coil.

12. The electric supply apparatus according to claim 1, wherein
    the first cover includes:
    a flat portion formed so as to be located above a hollow portion of the electric supply coil; and
    an incline portion formed in a portion of the first cover being where the electric supply coil is projected when the electric supply coil is projected on the casing toward the electric reception section, and gradually approaching the electric supply coil toward the flat portion in a radial direction of the electric supply coil.

13. The electric supply apparatus according to claim 12, wherein:
    the flat portion is formed so as to cross a central axis of the electric supply coil;
    the second cover is placed so as to cross the central axis of the electric supply coil; and
    the second cover has a larger area than the flat portion.

14. The electric supply apparatus according to claim 1, wherein the part of the second cover has a smaller area than the first cover.

15. The electric supply apparatus according to claim 1, wherein the second cover is concentric to the electric supply coil.

16. The electric supply apparatus according to claim 1, further comprising a first reinforcement member that supports the first cover.

17. The electric supply apparatus according to claim 16, wherein a space surrounded by the first cover, the second cover, and the first reinforcement member is sealed.

18. The electric supply apparatus according to claim 1, further comprising a second reinforcement member that is connected to a bottom portion of the casing and the second cover, that is placed in a hollow portion of the electric supply coil, and that support the second cover.

19. The electric supply apparatus according to claim 1, wherein the first cover includes a surface covered with a material having a frictional coefficient less than a predetermined value.

20. The electric supply apparatus according to claim 1, wherein the second cover is formed of heat-resistant glass.

21. The electric supply apparatus according to claim 1, wherein the electric supply apparatus has a space between the part of the second cover and the electric supply coil.

\* \* \* \* \*